US009747095B1

(12) United States Patent
Furman

(10) Patent No.: US 9,747,095 B1
(45) Date of Patent: Aug. 29, 2017

(54) SYSTEM AND METHOD FOR AUTOMATED CONTENT AND SOFTWARE MIGRATION

(71) Applicant: JPMorgan Chase Bank, N.A., New York, NY (US)

(72) Inventor: Aleksandr Boris Furman, Cliffside Park, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 51 days.

(21) Appl. No.: 14/692,068

(22) Filed: Apr. 21, 2015

(51) Int. Cl.
G06F 9/44 (2006.01)
G06F 9/445 (2006.01)
H04L 29/08 (2006.01)

(52) U.S. Cl.
CPC ............... *G06F 8/65* (2013.01); *H04L 67/10* (2013.01)

(58) Field of Classification Search
CPC ...................................................... G06F 8/65
USPC ........................................................ 717/170
See application file for complete search history.

(56) References Cited

U.S. PATENT DOCUMENTS

| | | | | |
|---|---|---|---|---|
| 2006/0075074 A1* | 4/2006 | Perry | ................... | H04L 67/2823 709/220 |
| 2010/0257518 A1* | 10/2010 | Baratti | ...................... | G06F 8/65 717/168 |
| 2014/0304694 A1* | 10/2014 | Huff, II | ...................... | G06F 8/68 717/168 |
| 2015/0154233 A1* | 6/2015 | Lightner | ................... | G06F 8/61 714/32 |

OTHER PUBLICATIONS

"SCCM 2012—Migration Made Easy—Parts 1-3"; CSS Security blog website (blog.csssecurity.com); May 16, 2012.*
Daalmans, Peter; "How to Update ConfigMgr Clients Automatically"; ConfigMgrBlog.com website; Mar. 12, 2012.*
Layfield, Rhonda; "Migrating from SCCM 2007 to SCCM 2012"; Windows IT Pro website (http://windowsitpro.com); May 7, 2014.*

* cited by examiner

*Primary Examiner* — Qing Chen
*Assistant Examiner* — Clint Thatcher
(74) *Attorney, Agent, or Firm* — Goodwin Procter LLP

(57) ABSTRACT

Embodiments of the present invention are directed to a system and method for migrating application and packages configured for a first version of a configuration manager to a second version of the configuration manager. The method prepares the packages and applications for migration from the first version of the configuration manager to the second version of the configuration manager using a Migration Preparation Engine. The package comprises at least one program. The application comprises at least one deployment type record. The method migrates the package and associated at least one program as well as the application and associated at least one deployment type record from the first version of the configuration manager to the second version of the configuration manager using the using the Migration Execution Engine. The method stores a migration record in a computer memory to record the migration of the package and application.

20 Claims, 9 Drawing Sheets

SYSTEM AND METHOD FOR AUTOMATED CONTENT AND SOFTWARE MIGRATION

BACKGROUND OF THE INVENTION

A configuration manager helps administrators manager large groups of computer systems. The configuration manager may provide remote control, patch management, software distribution, operating system deployment, network access protection and hardware and software inventory. This process provides consistency, simplifies desktop management, and reduces overall administrative costs, while providing the flexibility necessary to meet the diverse needs of the organization. For example, the Microsoft System Center Configuration Manager (SCCM) allows administrators to build customized installations of software, operating system images, and configurations that can be repeated across multiple desktop systems in an organization. However, when a new version of the configuration manager is released, the organization must rebuild the customized installations of software, operating system images, and configurations for the new version. For example, to migrate from SCCM 2007 version to SCCM 2012 version, all content (e.g., software packages) and related deployment objects (e.g., collections and advertisements) used in SCCM 2007 must be recreated in SCCM 2012. To accomplish this migration, traditional approaches include creating all content and related objects in SCCM 2012 or using a migration utility.

However, these approaches suffer from several problems. For instance, creating all content and related objects in SCCM 2012 requires extensive reprogramming and is not suitable for large SCCM installations (e.g., for large organizations). Similarly, using a migration utility is a manual process that cannot be automated, thus rendering it ineffective for large SCCM installations. Further, migration tools have built-in restrictions on what can be migrated. As a result, a migration tool can assist in the migration of only a small subset of content in a large and complex environment.

Thus, there exists a need for a custom migration tool for migrating application and packages configured for one version of a configuration manager to another version to solve several problems, including the following. A custom migration tool is required to perform automated pre-migration cleanup to dynamically reduce the content being migrated. For example, tens of thousands of packages in SCCM 2007 need to be dynamically filtered to include only the latest software into migration scope. The custom migration tool should also perform dynamic flattening of the content. That is, it must select only one instance of a package version for migration. For example, the custom migration tool should select only one instance of a SCCM 2007 package for migration from multiple copies of the same package that may have been created for each region (by duplication). During the process of flattening, the custom migration tool should be able to compare the multiple instances of the same package to determine if they are identical. If the instances are not identical, the custom migration tool must be able to select the correct instance for migration.

The custom migration tool may use a set of rules to determine whether or not a package may be migrated from one version to another. For example, the custom migration tool should determine if a SCCM 2007 package can be migrated as an SCCM 2012 Application or a legacy package. The set of rules and the logic using it should be flexible enough to handle complex packages. The custom migration tool may be able to modify non-standard able to modify non-standard commands to make them compatible with the updated version. The custom migration tool may also need to link the package identifiers of packages of the original version to the new version's application or packages to prevent re-running of already installed packages on existing computer systems upgraded to the new version. The custom migration tool may also be able to rerun the custom migration process on a predetermined schedule and migrate the remaining packages and objects to the new version. Further, the custom migration tool must be able to perform the above identified tasks in an automated manner (with minimal manual interaction). The custom migration tool may also be able to report its progress.

SUMMARY OF THE INVENTION

To address the above identified problems, including many more problems with existing migration tools, embodiments of the current invention are directed to a system and method for migrating application and packages configured for one version to another version. Embodiments of the presented invention disclose an Automated Custom Migration Tool that may comprise a custom designed database and migration scripts to import packages, collections, advertisement tables from multiple old-version databases into the custom database. The Automated Custom Migration Tool may limit the number of packages, collections, advertisement tables using a list of pre-approved packages and custom tables containing exceptions, resulting in a smaller storage space requirement when compared to existing systems and methods. The Automated Custom Migration Tool may flatten the content based on one or more rules. The Automated Custom Migration Tool may resolve any discrepancies during migration. As a result, the Automated Custom Migration Tool may provide a scalable mechanism for automated migration of application and packages from one version of a configuration manager to another. Further, the Automated Custom Migration Tool provides an efficient tool that improves the processing speed of one or more processors involved in the migration of multiple packages, program, applications and deployment types form one version of the configuration manager to another since the translation of migrated objects may be streamlined and optimized.

BRIEF DESCRIPTION OF DRAWINGS

The present invention will now be described, by way of example only, with reference to the accompanying Figures, in which.

The following describes in detail various embodiments of the present invention. One of ordinary skill in the art would understand that standard programming and engineering techniques may be used to produce such embodiments including software, firmware, hardware, or any combination thereof to implement the disclosed subject matter. The attached Figures depict exemplary embodiments and are meant to be understood in view of the details disclosed herein.

DETAILED DESCRIPTION OF PREFERRED EMBODIMENTS

Embodiments of the present invention are directed to a system and method for an Automated Custom Migration tool that provides for migrating application and packages configured for one version of a configuration manager to another version. The system may be semi or fully automated to migrate one or more applications and packages, including associated programs and properties from one version of a configuration manager to another version. The system may be triggered automatically upon the occurrence of an event (e.g., on a particular date/time) or may be manually triggered by a user.

Figure 1:
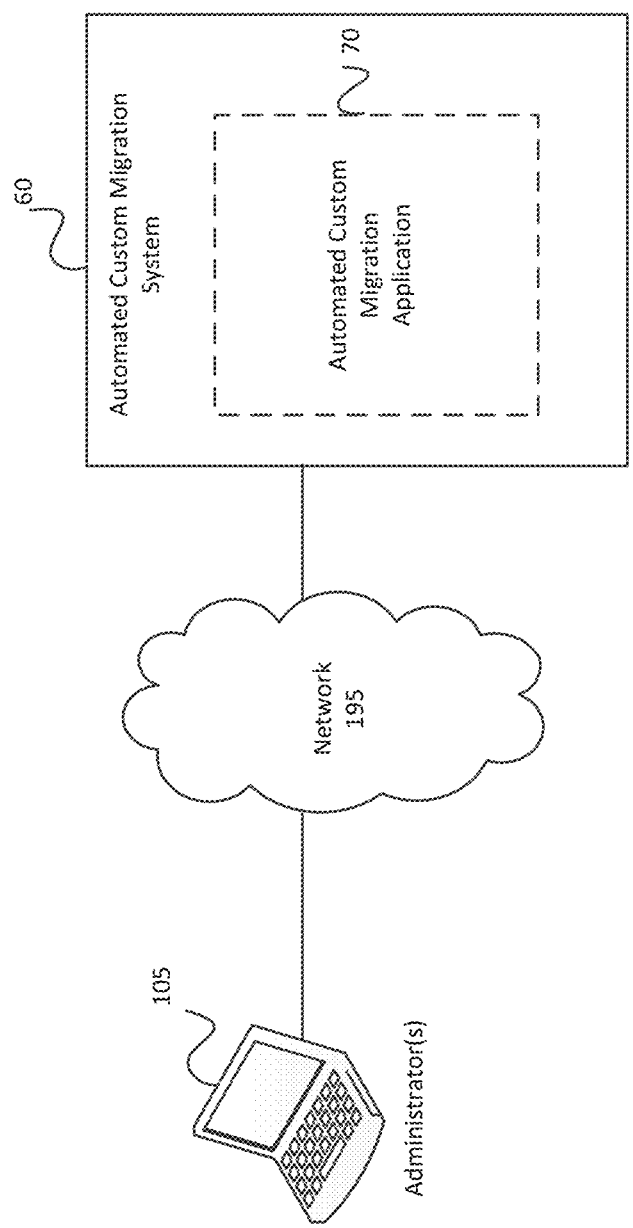
FIG. 1 is a block diagram illustrating an operating environment for an Automated Custom Migration System in accordance with an embodiment of the invention.

FIG. 1 is a block diagram illustrating an operating environment for an Automated Custom Migration System in accordance with an embodiment of the invention. The Automated Custom Migration System 60 includes an Automated Custom Migration Application 70. The Automated Custom Migration System 60 is connected through a communications medium over a Network 195, such as the Internet, an Intranet, a local-area-network (LAN), a wide-area-network (WAN), etc., to one or more Administrator(s) 105. The Administrator(s) 105 may control one or more aspects of the Automated Custom Migration System 60. For example, the Administrator(s) 105 may update the trigger events associated with the Automated Custom Migration System 60, the version of the configuration manager, etc.

The network 195 is preferably the Internet, but may be or include other types of networks. The network 195 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Figure 2:
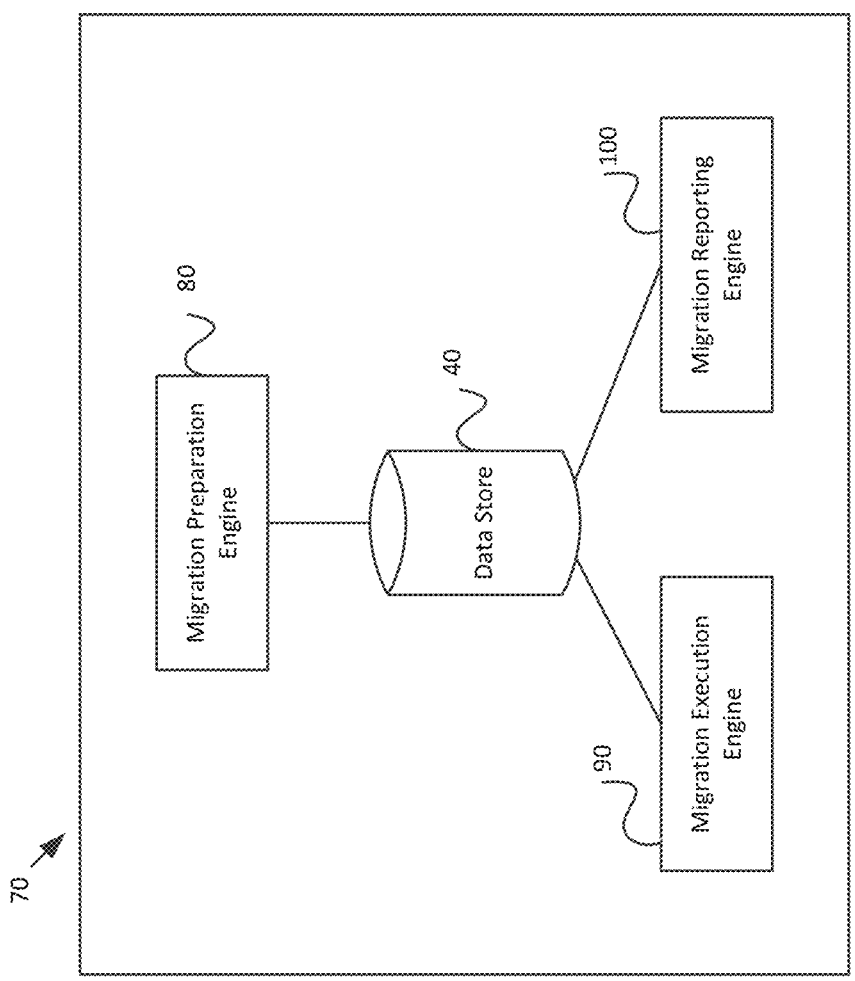
FIG. 2 is an exemplary embodiment illustrating various components of an Automated Custom Migration system.

FIG. 2 is an exemplary embodiment illustrating various components of an Automated Custom Migration system 60. An Automated Custom Migration Application 70 includes a Data Store 40, a Migration Preparation Engine 80, a Migration Execution Engine 90, and a Migration Reporting Engine 100. In an embodiment of the invention, the Data Store 40 may be a database that is local to the Automated Custom Migration system 60 and stores data used by the Automated Custom Migration Application 70. The Migration Preparation Engine 80 may prepare the packages and applications associated with one version of a configuration manager to another version of the configuration manager. The Migration Execution Engine 90 may execute the migration of the packages and applications associated with one version of a configuration manager to another version of the configuration manager. The Migration Reporting Engine 100 may access the data associated with the preparation and/or execution of the migration process and provide one or more reports based on that data.

Figure 3:
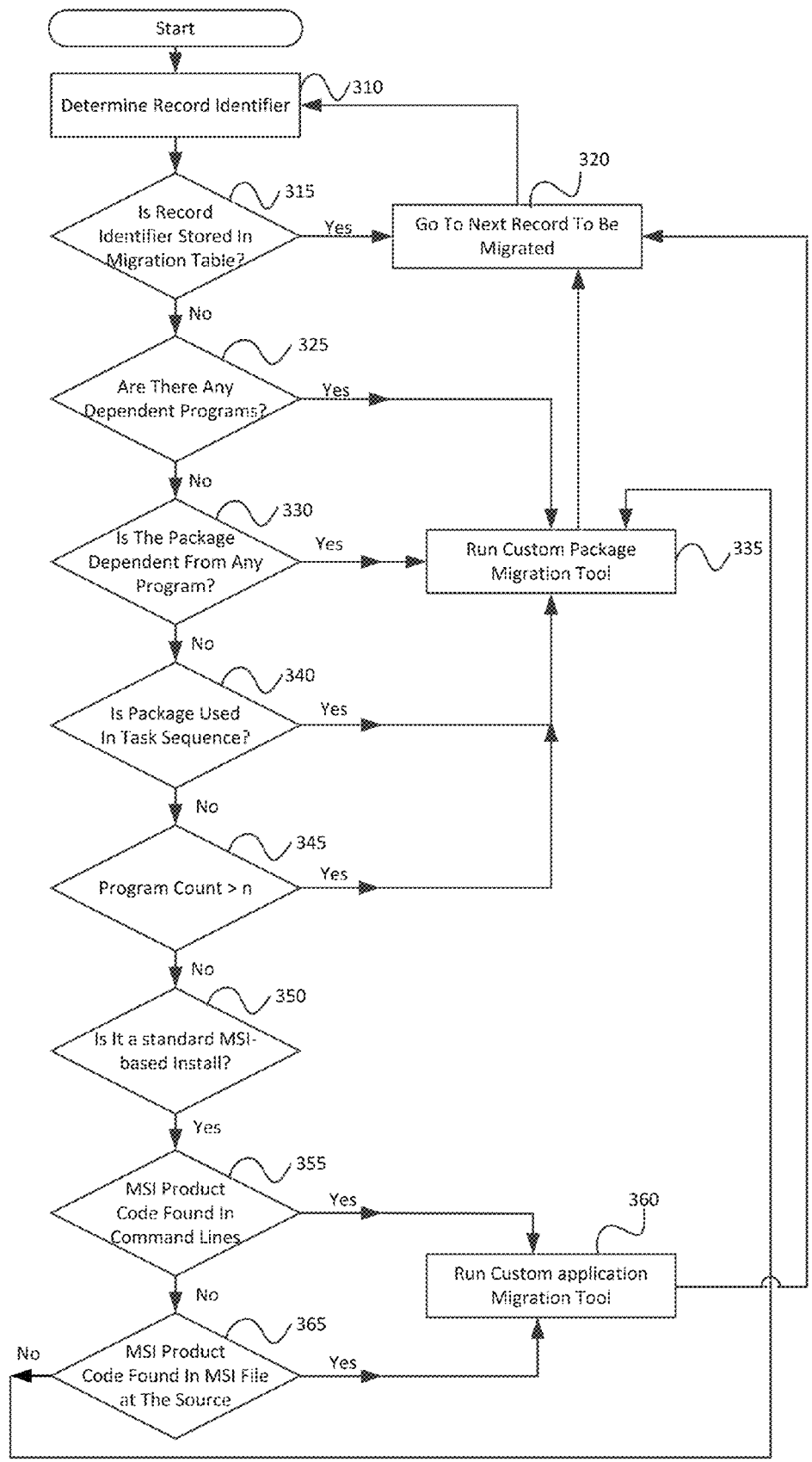
FIG. 3 is a flow diagram illustrating the preparation phase in an Automated Custom Migration system.

FIG. 3 is a flow diagram illustrating the preparation phase in an Automated Custom Migration system. The preparation phase begins at step 310 where it determines a record identifier associated with a record to be migrated. The record may be a package or an application. Upon determining the record identifier, in step 325, the Automated Custom Migration Application 70, in step 315, determines if the record identifier is stored in the migration table(s). This is a check for possible duplicate records. If the record identifier is stored in the migration table(s) (i.e., the record has been previously migrated), the method then goes to the next record to be migrated in step 320. However, if the record identifier is not stored in the migration table(s) (i.e., the record has not been previously migrated), in step 325, the method determines if there are any program(s) dependent on the record being examined. If the number of program(s) dependent on the record is greater than one (i.e., there are program(s) dependent on the record being examined), the method runs the custom package migration tool in step 335 (discussed in more detail with reference to FIG. 4A). If no programs are dependent on the record being examined, the method, in step 330, determines if any of the programs in the package dependent from another program. If yes, the method runs the custom package migration tool in step 335 (discussed in more detail with reference to FIG. 4A). If no, the method, in step 340, determines if the package is used in a task sequence. If yes, the method runs the custom package migration tool in step 335 (discussed in more detail with reference to FIG. 4A). If no, the method, in step 345, determines if the number of programs associated with the package is greater than a predetermined number, 'n'. For example, if the method is migrating packages and applications from SCCM 2007 to SCCM 2012, the value of 'n' may be two.

The method may determine, in step 345, whether the number of programs in the package is greater than 2. If the answer is yes (i.e., the number of programs is more than two), it may be difficult to determine with a high certainty which program to use as an installation command (which is a requirement for SCCM 2012). The method then determines, in step 350, the deployment type of the record. For example, if the deployment type is a standard Microsoft Installer (MSI) based installer, the method checks, in step 355, whether a MSI product code is found in the command lines. A product code is a principal identification of an application or product. If the answer is yes, in an embodiment of the invention, the method, in step 360, runs the custom application migration tool (discussed in more detail with reference to FIG. 4B). If an MSI product code is not found in step 355, the method, in step 365, determines if the MSI product code is found in the MSI file itself. If the MSI product code is found in the MSI file, the method, in step 360, runs the custom application migration tool (discussed in more detail with reference to FIG. 4B). If a product code is not found, the method runs the custom package migration tool in step 335 (discussed in more detail with reference to FIG. 4A). Upon running either the custom package migration tool in step 335 or the custom application migration tool in step 360, the method goes to the next record to be migrated, in step 320. This process repeats for all records that are to be migrated from one version of the configuration manager to another version.

Figure 4A:
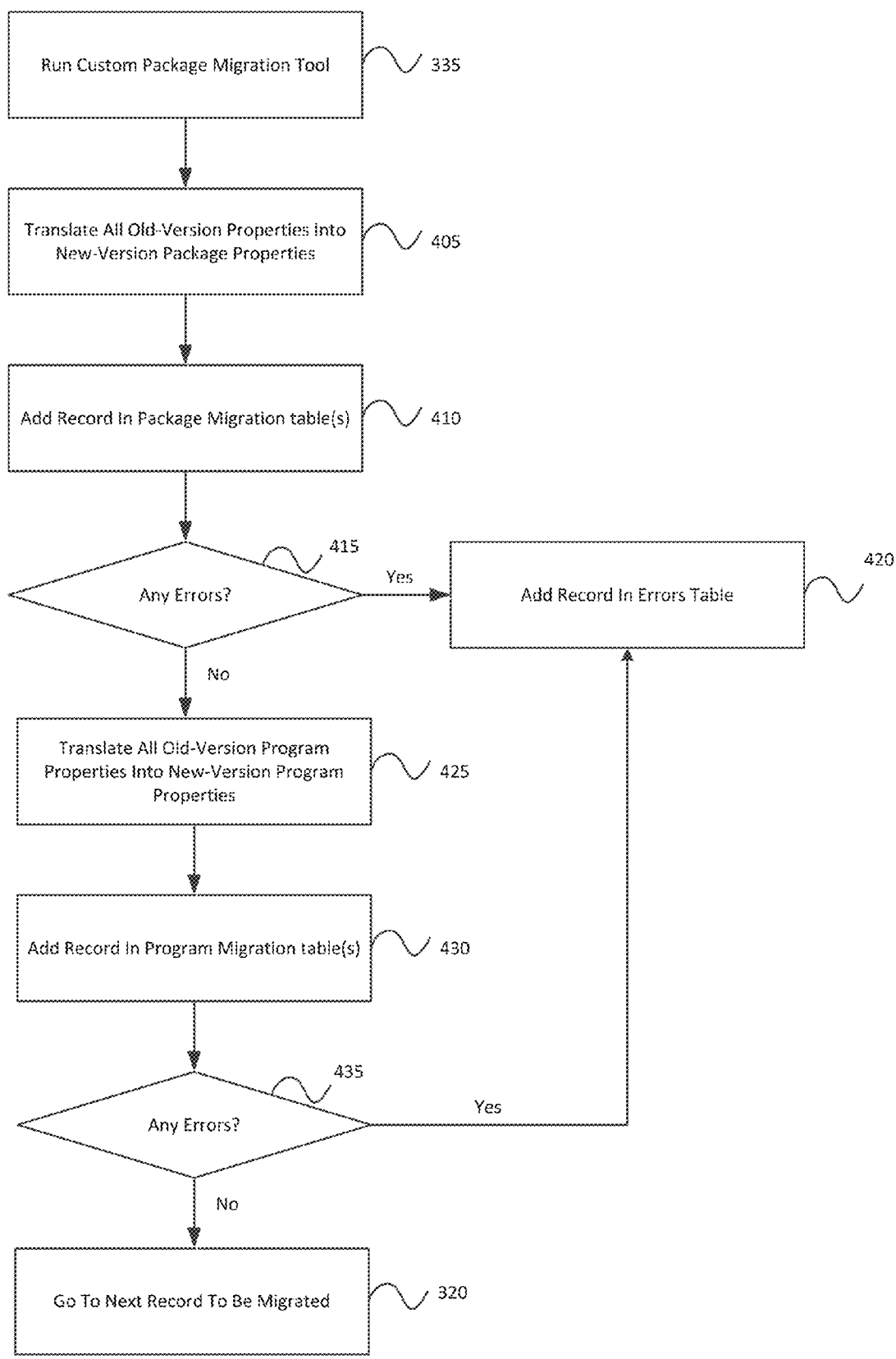
FIG. 4A is a flow diagram illustrating the steps performed by a package migration tool in an Automated Custom Migration system.

FIG. 4A is a flow diagram illustrating the steps performed by a package migration tool an Automated Custom Migration system. Specifically, FIG. 4A illustrates the steps performed when the Automated Custom Migration Application 70 runs the custom package migration tool in step 335. In step 405, the method translates the properties of the package in the old-version to properties in the new version of the configuration manager. Examples of properties include, but are not limited to, package identifier, package instances (e.g., all known duplicate instances of the same package in multiple package databases), product language, product manufacturer, source path to the binary files associated with the package, content size of the package, result of content availability check on file share, and file share name. The method then, in step 410, adds a record in the package migration table based on the new-version package properties. If an error is detected, in step 415, a record is added in the errors table in step 420. The errors table may store the following information: tracking identifier, type of object (e.g., package, program, deployment type, application, collection, assignment, etc.), date, source site for the old version of the configuration manager, target site for the new version of the configuration manager, phase (e.g., preparation, execution, etc.), error, and comment.

If no error is detected, in step 425, the method translates the properties of each program associated with package from the old version to the new version. Example of program properties include, but are not limited to, package identifier for the package with which the program is associated, package name, program name, description, command line, program flags (e.g., settings controlling the program's behavior), maximum allowed execution time, minimum disk requirements, dependent programs (if any), specific driver letter requirement, and comments. Examples of program flags include, but are not limited to: program is authorized for dynamic install, task sequence shows a custom progress user interface message, default program, disable alerts when program runs, always run immediate dependent, program offered to desktop clients, countdown dialog is displayed, program is disabled, program requires no user interaction, program can run only when a user is logged on, program must be run as the local administrator account, program must be run by every user for whom it is valid, program is run only when no user is logged on, program will restart the computer, configuration manager restarts the computer when the program has finished running successfully, use a Universal Naming Convention (UNC) path (i.e., no drive letter) to access the distribution point, persist the connection to the drive specified in the drive letter property, run the program as a minimized window, run the program as a maximized window, hide the program window, logoff user when program completes successfully, override check for platform support, run uninstall from the registry key when the advertisement expires, etc. Then, in step 430, the method adds a record in the program migration table(s). If an error is detected, in step 435, a record is added in the errors table in step 420. If no error is detected, the method goes to the next record to be migrated (step 320 from FIG. 3).

Figure 4B:
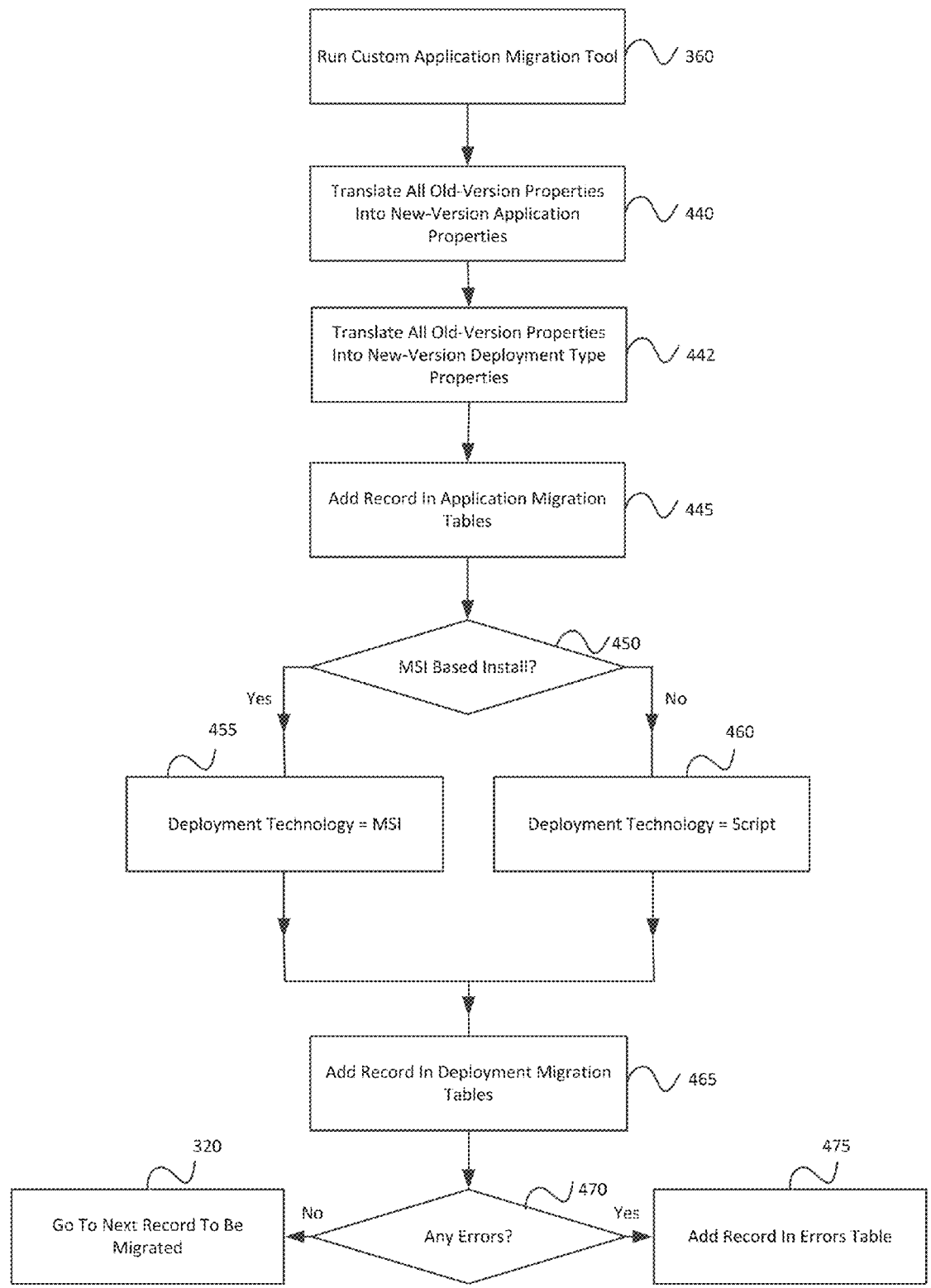
FIG. 4B is a flow diagram illustrating the steps performed by an application migration tool in an Automated Custom Migration system.

FIG. 4B is a flow diagram illustrating the steps performed by a package migration tool an Automated Custom Migration system. Specifically, FIG. 4B illustrates the steps performed when the Automated Custom Migration Application 70 runs the custom application migration tool in step 360. In step 440, the method translates the properties of the application in the old-version to properties in the new version of the configuration manager. Examples of application properties include, but are not limited to, identifier, all known duplicate instances of the same application, language, manufacturer, source path to binaries, content size, result of content availability on the file share and file share name. In step 442, the method translates the properties of the deployment type in the old-version to properties in the new version of the configuration manager. Examples of deployment type properties include, but are not limited to, package identifier, package name, program name, description, version, publisher, language, install command line, uninstall command line, program flags, deployment type (e.g., MSI or script based), product code, file name, detection method (i.e., method for detecting whether the product is installed), enhanced detection method (i.e., enhanced method for detection whether the product is installed), script language used in detection, reboot requirement flag, elevated rights requirement flag, user interaction requirement flag, requires log on flag, what to do when slow network is detected (e.g., run, download and run, or don't run), what to do if fast network is detected (e.g., run, download and run, or don't run), platform on which product can be installed, maximum allowed execute time, minimum disk space requirement, and operating system requirement.

In step 445, the method adds record(s) in the application migration table(s). The method then determines if the install type of the application is based on MSI. If the install is based on MSI, the method, in step 455, designates the deployment technology as MSI. If the install is not based on MSI, the method, in step 460, designates the deployment technology as Script. The method then, in step 465, adds a record in the deployment migration table(s). If an error is detected, in step 470, a record is added in the errors table in step 475. If no error is detected, the method goes to the next record to be migrated (step 320 from FIG. 3).

Figure 4C:
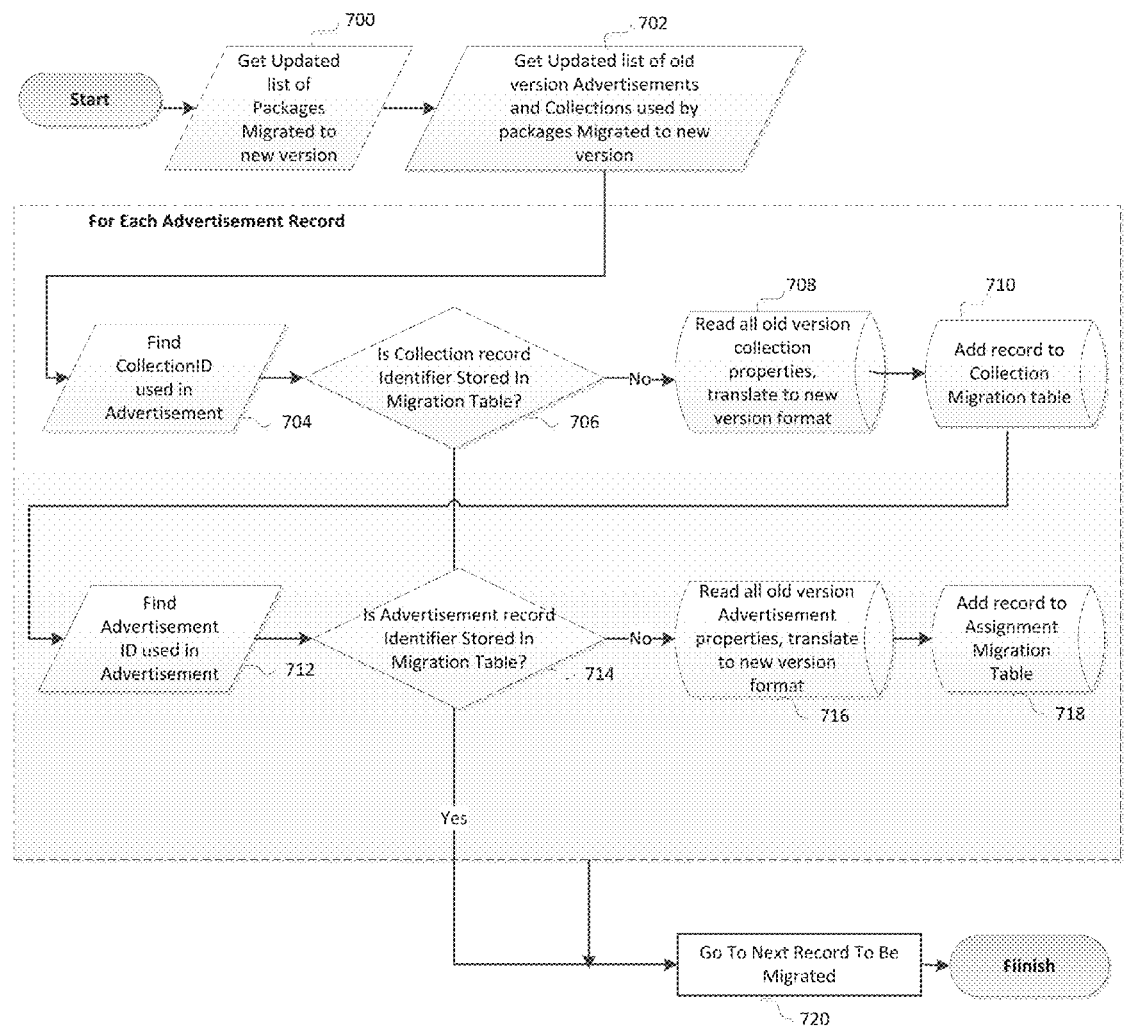
FIG. 4C is a flow diagram illustrating the steps performed by a collection and advertisement migration tool in an Automated Custom Migration system.

FIG. 4C is a flow diagram illustrating the steps performed by a collection and advertisement migration tool in an Automated Custom Migration system. The steps illustrated in FIG. 4C may be executed after the steps illustrated in FIG. 4A (discussed in detail above). The method of FIG. 4C begins at step 500 by retrieving an updated list of packages migrated to the new version of the configuration manager (at the end of execution of the method illustrated in FIG. 4A). Then, at step 702, the method gets an updated list of advertisements and collections (in the old version of the configuration manager) that were used by the packages migrated to the new version of the configuration manager. For each advertisement record, the method performs the following steps. At step 704, the method determines the identifier of the collection record used in the advertisement. Then, at step 706, it determines if the collection record if stored in the migration table. If the collection record is stored in the migration table, the method goes to the next record to be migrated, at step 720. However, if the collection record is not stored in the migration table, the method, at step 708, reads the properties of the collection record in the old version of the configuration manager, and translates it to the new version of the configuration manager. Examples of collection record properties include, but are not limited to, collection identifier, collection name and collection comment. The method, at step 710, adds a record to the collection migration table. Then, at step 712, the method finds the advertisement id for the advertisement record, and determines, at step 714, whether the advertisement record identifier is stored in the migration table. If yes, the method goes to the next record to be migrated, at step 720. However, if the advertisement record is not stored in the migration table, the method, at step 716, reads the properties of the advertisement record in the old version of the configuration manager, and translates it to the new version of the configuration manager. Examples of collection record properties include, but are not limited to, package identifier, content name (e.g., package name or application name), program name, advertisement identifier, target collection identifier, target collection name, migration category, mandatory schedule (e.g., once on certain date and time, every Tuesday at 9 AM, daily at 11 PM, etc.), and various flags (discussed in detail with reference to FIG. 4A). The method then adds a record to the assignment migration table, at step 718.

Figure 5:
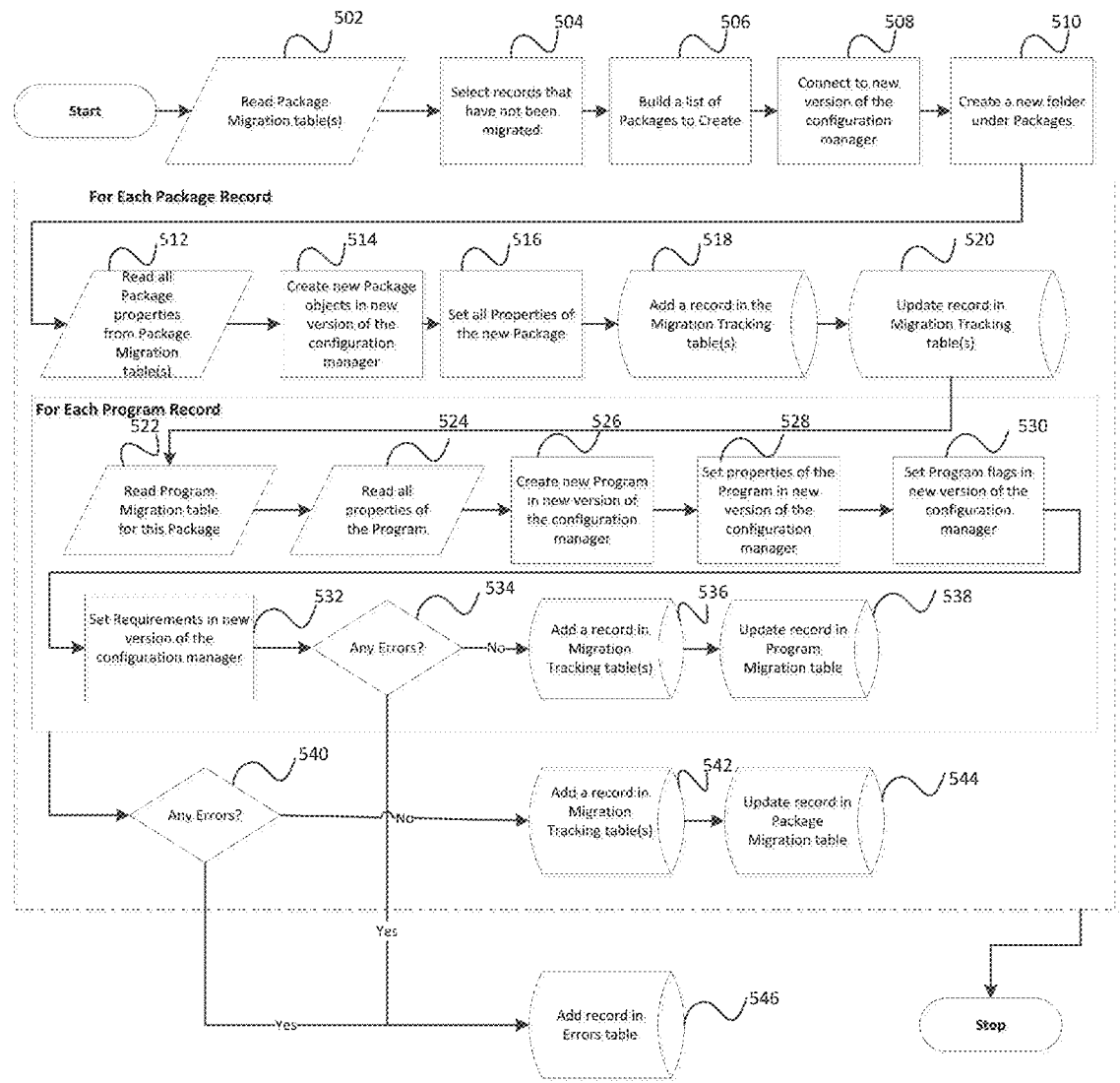
FIG. 5 is a flow diagram illustrating the execution phase in an Automated Custom Migration system.

FIG. 5 is a flow diagram illustrating the execution phase in an Automated Custom Migration system. Specifically, FIG. 5 illustrates the steps performed during the execution phase for packages and programs. The method begins at step 502 by reading the records in the package migration table(s). As discussed above in reference to FIG. 4A, records are added to the package migration table(s) during the preparation phase. In step 504, the method determines and selects the records that have not been migrated to the new version of the configuration manager. In step 506, the method builds a list of all the packages that have not been migrated and thus, need to be created in the new version of the configuration manager. The method then establishes a connection to the new version of the configuration manager in step 508, and creates a new folder under Packages, in step 510. Then, for each package that in the list of packages (created in step 506), the method performs the following steps.

In step 512, the method reads the package properties for the package from the package migration table(s). As discussed above, the package properties may be translated from the old version to the new version in step 405 (FIG. 4A). The method, in step 514, creates one or more new packages in the new version of the configuration manager, and sets the properties of the new package, in step 516. A new record is then added in the migration tracking table(s) in step 518. One or more records in the migration tracking table(s) may be updated in step 520. In an embodiment of the invention, the following information may be added/updated in the migration tracking table(s): tracking identifier, type of object (e.g., package, program, deployment type, application, collection, and assignment), migration date time, source configuration manager site, target configuration manager site, new identifier of the migrated object, comments, etc.

For each program associated with the package being migrated, the method performs the following steps. In step 522, the method reads the program migration table(s) for the package being migrated, and in step 524, reads the properties of the program. As discussed above, a record is added in the program migration table(s) during the preparation phase (step 430 in FIG. 4A). The method, in step 526, creates a new program, and in step 528, sets the properties of the new program in the new version of the configuration manager. In step 530, the method sets one or more flags associated with the program (discussed in detail with reference to FIG. 4A) and sets one or more requirements in the new version of the configuration manager, in step 532. Examples of requirements include, but are not limited to, maximum execution time, disk requirement, and operating system requirements.

If an error is detected, in step 534, a record is added in the errors table in step 546. If no error is detected, in step 542, the method adds a record in the migration tracking table(s). In step 544, the method may update one or more records in the package migration table(s).

Figure 6:
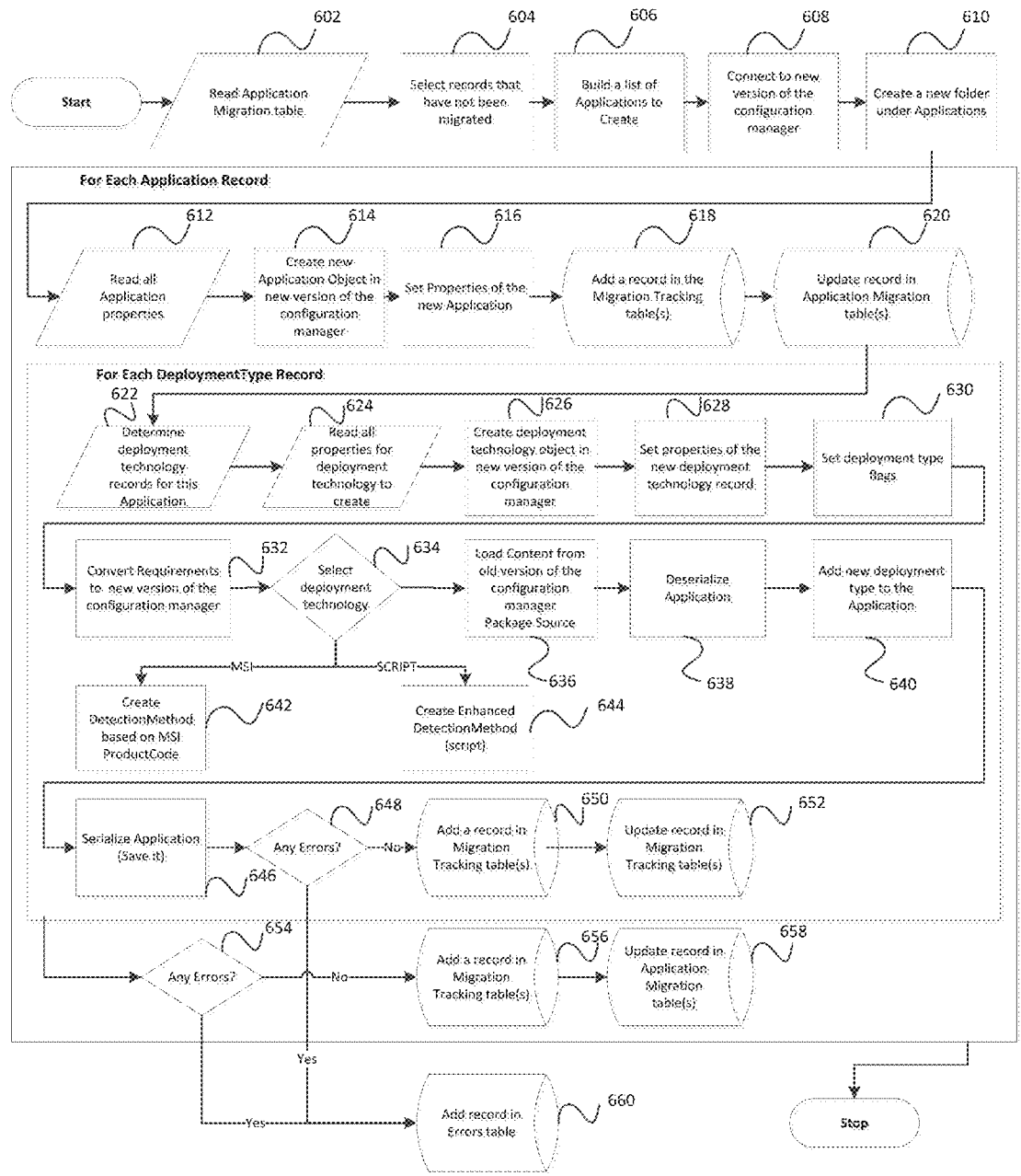
FIG. 6 is a flow diagram illustrating the execution phase in an Automated Custom Migration system.

FIG. 6 is a flow diagram illustrating the execution phase in an Automated Custom Migration system. Specifically, FIG. 6 illustrates the steps performed during the execution phase for applications and deployment types. The method begins at step 602 by reading the records in the application migration table(s). As discussed above in reference to FIG. 4B, records are added to the application migration table(s) during the preparation phase. In step 604, the method determines and selects the records that have not been migrated to the new version of the configuration manager. In step 606, the method builds a list of all the applications that have not been migrated and thus, need to be created in the new version of the configuration manager. The method then establishes a connection to the new version of the configuration manager in step 608, and creates a new folder under Applications, in step 610. Then, for each application record that in the list of applications (created in step 606), the method performs the following steps.

In step 612, the method reads the application properties for the application from the application migration table(s). As discussed above, the application properties may be translated from the old version to the new version in step 440 (FIG. 4B). The method, in step 614, creates one or more new application objects in the new version of the configuration manager, and sets the properties of the new application object, in step 616. A new record is then added in the migration tracking table(s) in step 618. One or more records in the migration tracking table(s) may be updated in step 620. In an embodiment of the invention, the following information may be added/updated in the migration tracking table(s): tracking identifier, type of object (e.g., package, program, deployment type, application, collection, and assignment), migration date time, source configuration manager site, target configuration manager site, new identifier of the migrated object, comments, etc.

For each deployment type record associated with the application being migrated, the method performs the following steps. In step 622, the method reads the deployment technology record for the application and in step 624, it reads the properties of the deployment technology to create (as discussed above, the old deployment type properties are translated into new properties at step 442—FIG. 4B). In step 626, method creates a new deployment technology object in the new version of the configuration manager, and sets the properties of the deployment technology object in step 628 (discussed in detail above in reference to FIG. 4B, step 442). The method may set one or more deployment flags in step 630. The method, in step 632, may convert one or more requirements from the old version to the new version of the configuration manager. Examples of requirements include, but are not limited to, maximum execution time, disk requirement, platform, and operating system requirements.

In step 634, the method determines the deployment technology of the deployment technology record to create a detection method. A detection method may be used to specify how the application will be detected on client computers. For example, the detection method could use the properties of the Windows Installer application (MSI), such as the product code and version. Alternatively, the detection method could be achieved by using a custom script to look for a defined registry key or another mechanism to identify whether the application is installed. If the selected technology is MSI, in step 642, the method creates a detection method based on an MSI product code. If the selected technology is script, the method, in step 644, creates an enhanced detection method. The method then, in step 636, loads content of the installation source (e.g., setup.exe, install.MSI, batch file(s), script(s) and any other files used by the installation) from the old version of the configuration manager package source. In step 638, the method deserializes the application and in step 640, a new deployment type is added to the application. The method then serializes the application at step 646. If an error is detected, in step 648, a record is added in the errors table in step 660. If no error is detected, in step 650, the method adds a record in the migration tracking table(s). In step 652, the method may update one or more records in the package migration table(s). If any error is detected during the creation of the deployment type record (steps 622-652), the method, at step 654 detects such an error and adds a record in the errors table in step 660. If no error is detected, in step 656, the method adds a record in the migration tracking table(s). In step 658, the method may update one or more records in the package migration table(s).

Figure 7:
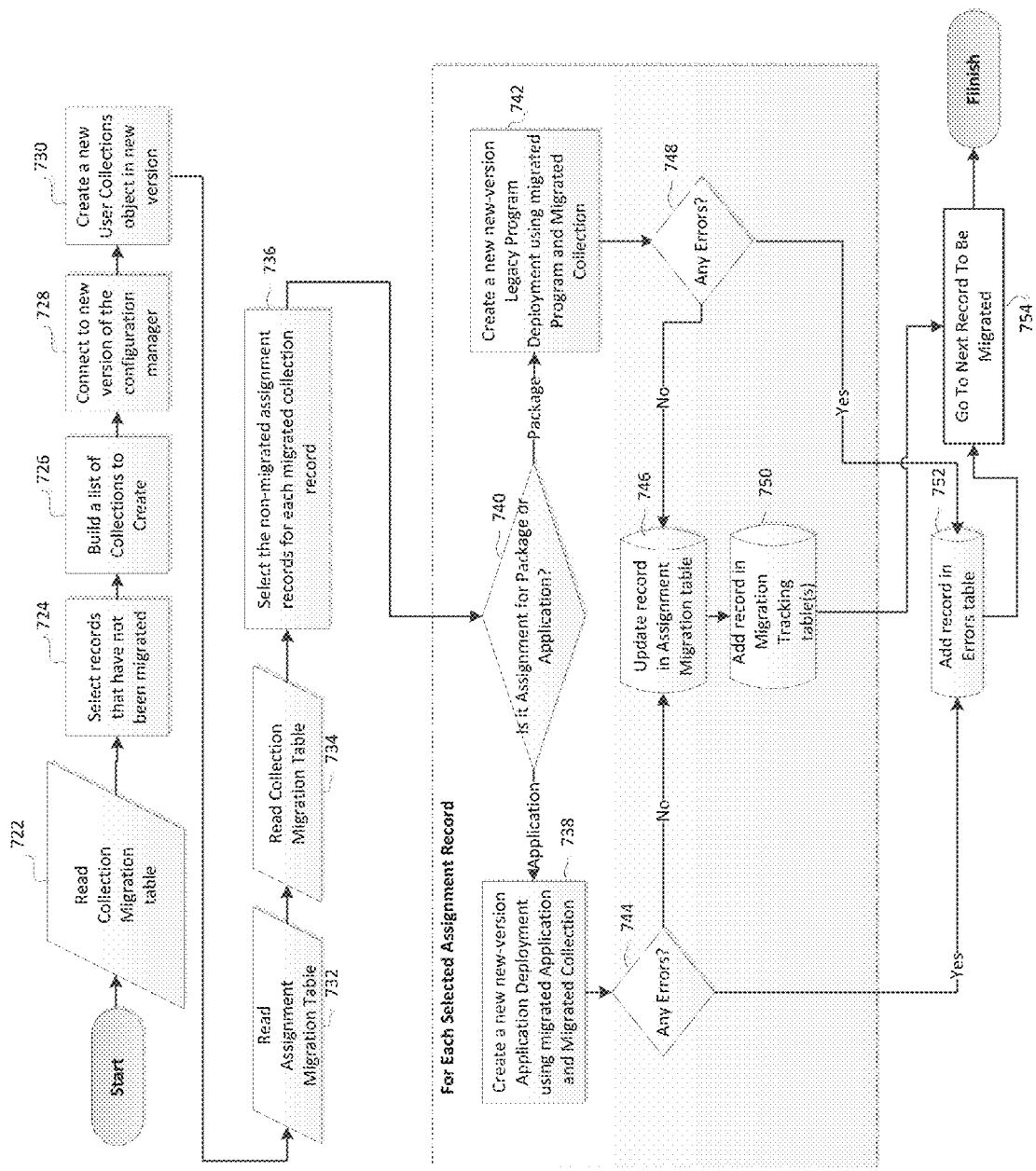
FIG. 7 is a flow diagram illustrating the execution phase in an Automated Custom Migration system.

FIG. 7 is a flow diagram illustrating the execution phase in an Automated Custom Migration system. Specifically, FIG. 7 illustrates the steps performed during the execution phase for collections and assignments. The method begins at step 722 by reading the records in the collection migration table(s). As discussed above in reference to FIG. 4C, records are added to the collection migration table(s) during the preparation phase. In step 724, the method determines and selects the records that have not been migrated to the new version of the configuration manager. In step 726, the method builds a list of all the collections that have not been migrated and thus, need to be created in the new version of the configuration manager. The method then establishes a connection to the new version of the configuration manager in step 728 and creates a new User Collections object, in step 730. The method then reads the assignment migration table (at step 732) and the collection migration table (at step 734) to select, at step 736, all the non-migrated assignment records for each collection record that has been migrated (i.e., is on the list created at step 726). Then, for each assignment record selected at step 736, the method performs the following steps.

The method determines, at step 740, if the assignment is for a package or an application. If the assignment is for an application, the method, at step 738, creates an application deployment in the new version of the configuration manager using the migrated application and migrated collection. On the other hand, if the method determines, at step 740, that the assignment is for a package, the method, at step 742, creates anew legacy program deployment in the new version of the configuration manager using the migrated program and migrated collection. In either case, the method determines if an error is detected (in step 744 or step 748). If yes, a record is added in the errors table in step 752 and the method proceeds to process the next record to be migrated, at step 754. If no error is detected, in steps 746 and 750, the method adds a record in the assignment migration table and the migration tracking table(s), respectively. The method then proceeds to process the next record to be migrated, at step 754.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

As described above, embodiments of the system and processes of the invention are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A computing system for migrating at least one record including application and packages configured for a first version of a configuration manager to a second version of the configuration manager, the system comprising:
　a computer memory storing instructions including a Migration Preparation Engine and a Migration Execution Engine;
　at least one computer processor executing the stored instructions to perform steps including:
　　preparing at least one package for migration from the first version of the configuration manager to the second version of the configuration manager using the Migration Preparation Engine, wherein the package comprises at least one program, wherein preparing the at least one package comprises determining whether to run a custom package migration tool by determining if at least one program is dependent on the record, determining, when no program is dependent on the record if any program in the package is dependent from another program, determining, when no program in the package is dependent from another program, if the package is used in a task sequence, and determining if the package is not used in a task sequence if a program count is greater than a pre-set threshold;
　　running the custom package migration tool when any of the following conditions is true: (a) at least one program is dependent on the record; (b) any program from the package is dependent from another program; (c) the package is used in a task sequence; and (d) the program count is greater than the pre-set threshold;
　　migrating the at least one package from the first version of the configuration manager to the second version of the configuration manager using the custom package migration tool by translating old version package properties into new version package properties and adding a record to a package migration table based on the new version package properties;
　　preparing, when conditions (a), (b), (c), and (d) are false, at least one application for migration from the first version of the configuration manager to the second version of the configuration manager using the Migration Preparation Engine, wherein the application comprises at least one deployment type record;
　　migrating the at least one application and associated at least one deployment type record from the first version of the configuration manager to the second version of the configuration manager using the Migration Execution Engine; and
　　storing at least one migration record in the computer memory to record the migration of the at least one application.

2. The system of claim 1, further comprising a Migration Reporting Engine to create at least one report based on the at least one migration record stored in the computer memory.

3. The system of claim 1, wherein the Migration Preparation Engine determines at least one dependency between the at least one package and a second package.

4. The system of claim 1, wherein the legality filter checks for illegal activity including terrorist activity and money laundering.

5. The system of claim 1, wherein the Migration Preparation Engine translates at least one property of the at least one application from the first version of the configuration manager to the second version of the configuration manager.

6. The system of claim 1, wherein the Migration Preparation Engine translates at least one property of the at least one deployment type from the first version of the configuration manager to the second version of the configuration manager.

7. The system of claim 1, wherein the deployment type is a standard Microsoft Installer.

8. The system of claim 1, wherein the deployment type is a script.

9. The system of claim 1, further comprising an Error Management Engine to record at least one error generated by the Migration Preparation Engine.

10. The system of claim 1, further comprising an Error Management Engine to record at least one error generated by the Migration Execution Engine.

11. A computer-implemented method for migrating at least one record including one or more applications and packages configured for a first version of a configuration manager to a second version of the configuration manager, the method comprising:
　storing instructions in at least one computer memory, the instructions including a Migration Preparation Engine and a Migration Execution Engine;
　implementing a computer processor for accessing the stored instructions in the computer and executing the instructions to perform steps including:
　　preparing at least one package for migration from the first version of the configuration manager to the second version of the configuration manager using the Migration Preparation Engine, wherein the package comprises at least one program, wherein preparing the at least one package comprises determining whether to run a custom package migration tool by determining if at least one program depends on the record, determining, when no program is dependent on the record if any program in the package is dependent from another program, determining, when no program in the package is dependent from another program, if the package is used in a task sequence, and determining if the package is not used in a task sequence if a program count is greater than a pre-set threshold;

running the custom package migration tool when any of the following conditions is true: (a) at least one program is dependent on the record; (b) any program from the package is dependent from another program; (c) the package is used in a task sequence; and (d) the program count is greater than the pre-set threshold;

migrating the at least one package from the first version of the configuration manager to the second version of the configuration manager using the custom package migration tool by translating old version package properties into new version package properties and adding a record to a package migration table based on the new version package properties;

preparing, when conditions (a), (b), (c), and (d) are false, at least one application for migration from the first version of the configuration manager to the second version of the configuration manager using the Migration Preparation Engine, wherein the application comprises at least one deployment type record;

migrating the at least one application and associated at least one deployment type record from the first version of the configuration manager to the second version of the configuration manager using the Migration Execution Engine; and storing at least one migration record in the computer memory to record the migration of the at least one application.

12. The method of claim 11, further comprising:
creating, using a Migration Reporting Engine, at least one report based on the at least one migration record stored in the computer memory.

13. The method of claim 11, wherein the Migration Preparation Engine determines at least one dependency between the at least one package and a second package.

14. The method of claim 11, wherein the Migration Preparation Engine translates at least one property of the at least one program from the first version of the configuration manager to the second version of the configuration manager.

15. The method of claim 11, wherein the Migration Preparation Engine translates at least one property of the at least one application from the first version of the configuration manager to the second version of the configuration manager.

16. The method of claim 11, wherein the Migration Preparation Engine translates at least one property of the at least one deployment type from the first version of the configuration manager to the second version of the configuration manager.

17. The method of claim 11, wherein the deployment type is a standard Microsoft Installer.

18. The method of claim 11, wherein the deployment type is a script.

19. The method of claim 11, further comprising an Error Management Engine to record at least one error generated by the Migration Preparation Engine.

20. The method of claim 11, further comprising an Error Management Engine to record at least one error generated by the Migration Execution Engine.

* * * * *